United States Patent Office 3,345,419
Patented Oct. 3, 1967

3,345,419
HYDRATION OF BICYCLO-(2.2.1) HEPTENES AND RELATED NORTRICYCLENES
Samuel W. Tinsley, Charleston, Donald L. MacPeek, South Charleston, and Paul S. Starcher, Charleston, W. Va., assignors to Union Carbide Corporation, a corporation of New York
No Drawing. Filed Sept. 25, 1963, Ser. No. 311,340
16 Claims. (Cl. 260—617)

This invention relates to the hydration of cyclic olefins, particularly of compounds containing the bicyclo-(2.2.1)heptene structure, and of related nortricyclene compounds to the corresponding cyclic alcohols.

The hydrated products obtained by the present process are valuable chemical intermediates used in the production of a variety of commercially utilizable products as illustrated, for example, by Raether et al. in "Industrial and Engineering Chemistry," vol. 2, No. 2 (June 1963), by German Patent 1,082,259, and U.S. Patent 2,912,447. They may be reacted with acids or anhydrides for the production of esters useful as solvents, plasticizers, and the like, and those containing an unhydrated double bond may be reacted through the double bond to yield still other useful products. With anepihaldohydrin, cyclic alcohols produced herein react to form glycidyl ethers valuable as components of condensation resins.

Particularly valuable as chemical intermediate is exo-tricyclo(5.2.1.0$^{2,6}$) dec-3-en - 8(9) - ol, which is obtained from endo-dicyclopentadiene by the process of this invention. Upon thermal dehydration, this intermediate forms exo-dicyclopentadiene which can be epoxidized to a diepoxide having a melting point substantially lower than that of its isomeric endo counterpart. While known processes for making exo-dicyclopentadiene are cumbersome and expensive, the present invention affords a convenient and commercially attractive synthetic route.

Despite the many applications, exemplified above, and the attendant commercial importance of exo-tricyclo-(5.2.1.0$^{2,6}$)-dec-3-en-8(9)-ol and similar compounds, however, no completely satisfactory process for their production has been developed. For example, while it is known to react bicyclo(2.2.1)olefins, including endo-dicyclopentadiene, with an at least stoichiometric quantity of sulfuric acid to produce the instant alcohols, such a synthesis has serious inherent defects. Since dilute (20 to 40 percent) sulfuric acid is employed, large volumes of reaction mixture need to be handled resulting in low product/reaction volume ratios. In addition, the corrosion of equipment and the hazard involved in the handling of sulfuric acid solutions are factors which make this process objectionable. Far more serious, however, is the difficulty of product recovery from the two-phase reaction mixture. Several subsequent operations are required to separate the aqueous and organic layers, wash the organic layer free of acid, and isolate the unused sulfuric acid for recovery or recycle, all of which contribute added processing costs. Finally, the sulfuric acid hydration is invariably accompanied by side reactions which lead to the production of high-boiling ethers, resins and tars, which lower the yield of product alcohol and further complicate its recovery.

The present process overcomes the above-mentioned disadvantages of known processes in that it does not require large volumes of sulfuric acid reagent, is eminently suitable for continuous operation, and presents no corrosion problems or personnel hazards. Furthermore, by proper adjustment of operating conditions, undesirable side reactions are substantially eliminated and product recovery is extremely simple in our process.

In a broad aspect, the process of the present invention comprises maintaining a feed mixture of water and of a cyclic reactant which can be either a compound containing a bicyclo(2.2.1)heptene double bond or a nortricyclene compound in a conversion zone, under hydration conditions, in the contacting presence of a catalyst comprising a synthetic aryl cation exchange resin.

The utilizable cyclic reactants are thus seen to comprise two general groups of compounds, bicyclo(2.2.1) heptene compounds containing the following structure,

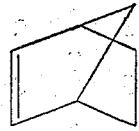

and the related tricyclo(2.2.1.0$^{2,6}$)heptane compounds, hereinafter sometimes referred to as nortricyclene compounds, containing the following structure,

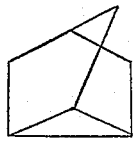

both of said structures being susceptible to ring substitution without affecting the basic efficacy of the present invention, as hereinafter more fully disclosed.

In the case of the bicyclo(2.2.1)heptene compound reactants, attack is at the bicyclo(2.2.1)heptene double bond during the process of this invention to yield a bicycloheptanol, as illustrated by the following equations:

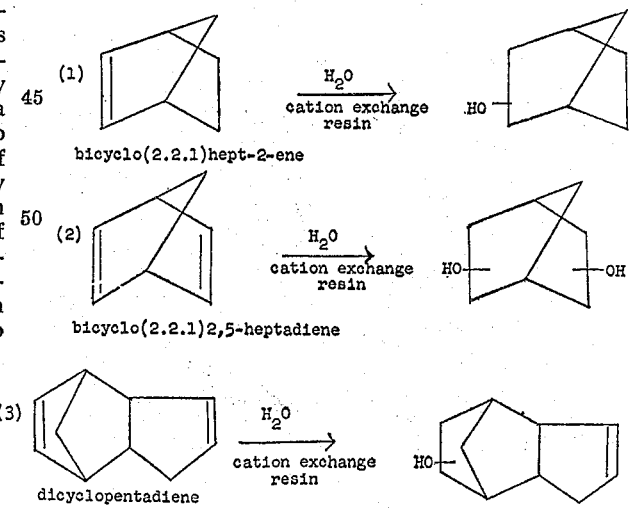

In the case of the nortricyclene starting materials, attack is on the three-membered ring similarly resulting in the formation of a bicyclo(2.2.1)heptanol:

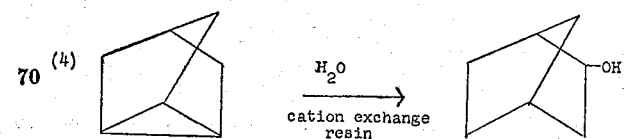

While we do not advance or rely on any particular theory underlying the success of this invention it can be postulated that the operativeness of the two classes of starting materials is partly dependent on the equilibrium known to exist between the two sructures:

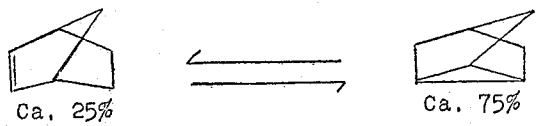

Ca. 25%     Ca. 75%

(See Schleyer, J. Am. Chem. Soc. 80, 1700 (1958).)

The first class of operative cyclic reactants, the bicyclo(2.2.1)heptene compounds, are characterized by the presence of a bicyclo(2.2.1)heptene double bond. By the term "bicyclo(2.2.1)heptene double bond" as used herein is meant a carbon-to-carbon double bond present in a compound containing the bicyclo(2.2.1)heptane moiety, i.e.

(I)

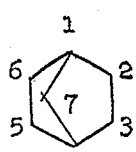

wherein the ring positions are numbered for convenient reference.

According to Bredt's Rule the double bond can exist only between the 2 and 3 positions or between the 5 and 6 positions. Therefore, the compounds that are hydrated according to the present invention comprise the bicyclo-(2.2.1)hept-2-ene structure (II) 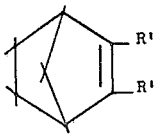

or the bicyclo(2.2.1)hepta-2,5-diene structure (III) 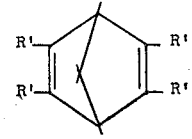

It will be understood that the free valences of structures (II) and (III), above, may be variously satisfied inasmuch as substitution thereon has not been found to alter those characteristics of the aforementioned double-bond that make said double-bond susceptible to hydration by this invention. Thus, said free valences, of which there are eight in structure (II) and four in structure (III), above, can be satisfied by such radicals as hydroxyl, halogen, amino groups and organic radicals, i.e. carbon-containing radicals, as well as by hydrogen. Furthermore, two such radicals satisfying free valences on adjacent carbon atoms in structure (II), above, may be joined together to form various ring systems. In addition, such radicals may themselves include bicyclo(2.2.1)heptene systems having a double bond to be hydrated by the present invention.

It will also be understood that the said radicals satisfying the free valences of structures (II) and (III), above, may contain functional groups, e.g. anhydrides, that will be altered during the hydration process of this invention.

However, substitution on the double-bonded ring carbon atoms has been found to be somewhat more critical. Thus, we have found that the R' substituents in structures II and III, above, can be hydrogen or any organic radical where the radical is linked to the double-bonded carbon atom through a carbon atom of the radical, but that R' cannot be halogen or alkoxy and the like where the carbon linkage requirement is not met. The R' substituents in a single compound may be alike or not alike.

In those cases where all the R' substituents are hydrogen, the double bonds to be hydrated by our process are quite unique and distinguishable from other types of carbon-to-carbon double bonds by their infrared absorption spectrum in that they show characteristic absorption at more than 6.32μ and less than about 6.40μ, usually at about 6.36μ. Conjugated straight-chain olefins which absorb at about 6.25μ and monocyclic olefin ring systems of more than 5 carbon atoms, e.g. cycloheptene which absorbs at 6.06μ, are thus distinguished.

As exemplary of specific starting materials having one bicyclo(2.2.1) double bond and utilizable in this invention, the following can be mentioned

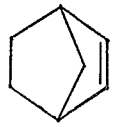

Bicyclo[2.2.1]hept-2-ene

Bicyclo[2.2.1]hepta-2,5-diene

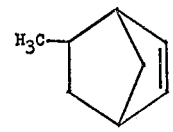

5-methylbicyclo[2.2.1]hept-2-ene

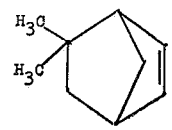

5,5-dimethylbicyclo[2.2.1]hept-2-ene

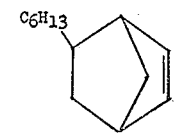

5-n-hexylbicyclo[2.2.1]hept-2-ene

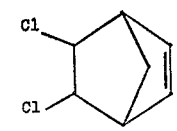

5,6-dichlorobicyclo[2.2.1]hept-2-ene

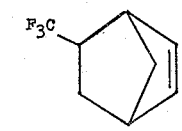

5-trifluoromethylbicyclo[2.2.1]hept-2-ene

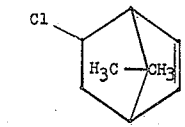

5-chloro-7,7-dimethylbicyclo[2.2.1]hept-2-ene

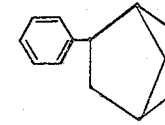

5-phenylbicyclo[2.2.1]hept-2-ene

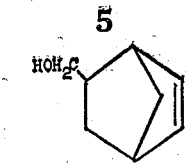

5-methylolbicyclo[2.2.1]hept-2-ene

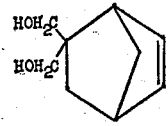

5,5-di(methylol)bicyclo[2.2.1]hept-2-ene

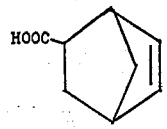

2-bicyclo[2.2.1]hept-5-enecarboxylic acid

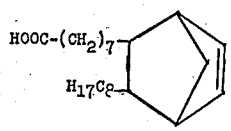

8-(3-octyl-2-bicyclo[2.2.1]hept-5-enyl)octanoic acid

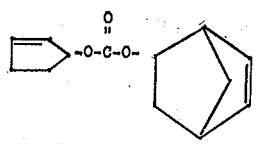

2-cyclopentenyl 5-(bicyclo[2.2.1]hept-2-enyl) carbonate

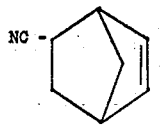

5-bicyclo[2.2.1]hept-2-ene carbonitrile

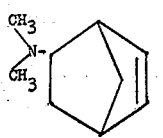

5-dimethylaminobicyclo[2.2.1]hept-2-ene

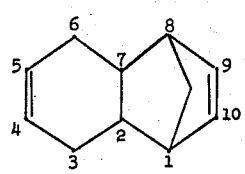

Tricyclo[6.2.1.0$^{2,7}$]undeca-4,9-diene

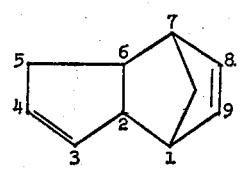

Dicyclopentadiene

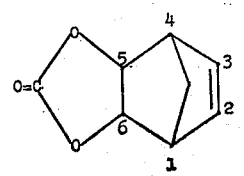

Bicyclo[2.2.1]hept-2-en-5,6-diol carbonate

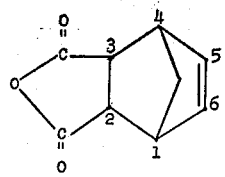

Bicyclo[2.2.1]hept-2-en-2,3-dicarboxylic anhydride

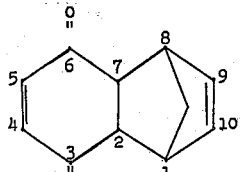

Tricyclo[6.1.1.0$^{2,7}$]undeca-4,9-diene-3,6-dione

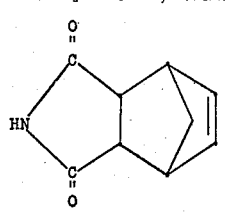

Bicyclo[2.2.1]hept-2-en-2,3-dicarboximide

It is an important aspect of our invention that double bonds other than those contained in a bicyclo(2.2.1) heptane structure are not affected by the process of this invention. Thus, dicyclopentadiene, listed above, is hydrated only at the double bond between the 8 and 9 position while the other double bond, contained in the five-membered ring between the 3 and 4 positions, remains as such during the process of our invention, to provide particularly valuable intermediates which can, e.g., be epoxidized through the remaining double bond to yield valuable resins.

In addition, compounds similar to those listed above but also having a substituent at one or more of the double-bonded ring carbon atoms are hydrated in accordance with our invention. Illustrative of such compounds are

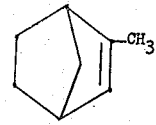

2-methylbicyclo[2.2.1]hept-2-ene

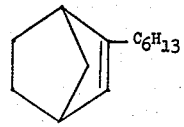

2-n-hexylbicyclo[2.2.1]hept-2-ene

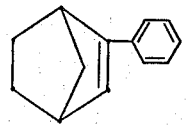

2-phenylbicyclo[2.2.1]hept-2-ene

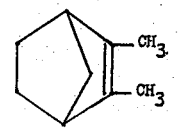

2,3-dimethylbicyclo[2.2.1]hept-2-ene

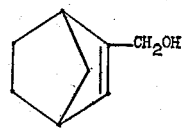

2-methylolbicyclo[2.2.1]hept-2-ene

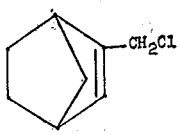

2-chloromethylbicyclo[2.2.1]hept-2-ene

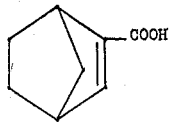

Bicyclo[2.2.1]hept-2-en-2-carboxylic acid

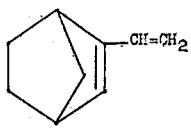

2-vinylbicyclo[2.2.1]hept-2-ene

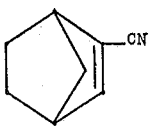

2-cyanobicyclo[2.2.1]hept-2-ene

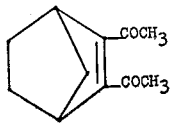

2,3-diacetylbicyclo[2.2.1]hept-2-ene and the like compounds wherein other ring carbon atoms are also substituted, as exemplified above.

It can thus be seen that the unoccupied valences of structures II and III, above, can be satisfied by such specific organic groups as alkyl, alkenyl, cycloalkyl, cycloalkenyl, either unsubstituted or substituted with, e.g. hydroxy, halogen, cyano, carboxyl, alkanoyloxy, carboxamido, amido, alkoxy, and the like radicals which radicals per se may also satisfy the said free valences. Two adjacent free valences in structure (II), above, may be linked by such divalent groups as alkylene, alkenylene, carbonate, imide, anhydride, ketone, or ether groups, and the like.

The R″ substituents on structures II and III, above, may similarly vary widely, i.e. they can be hydrogen, alkyl, alkenyl, aryl, cycloalkyl, cycloalkenyl, carboxyl, cyano, acyl, and the like groups which groups can, in turn, be substituted with the abovementioned radicals, provided that the linkage to the double-bonded ring carbon atom is through a carbon atom of the substituent group.

In cases where the starting material contains a functional group, such as an anhydride, the hydration process of this invention will result in cleavage of the anhydride as well as in hydration of the double bond. Also, Wagner-Meerwein rearrangements may occur so that the cyclic alcohols produced by this invention may carry the hydroxyl group at positions other than the carbon atoms initially forming the double bond.

As illustrative of compounds containing more than one bicyclo[2.2.1]heptene double bond, the following can be mentioned:

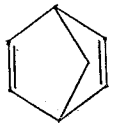

Bicyclo(2.2.1)-2,5-heptadiene

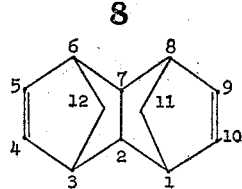

Tetracyclo[6.2.1$^{1,8}$,1$^{3,6}$.0$^{2,7}$]dodeca-4,9-diene

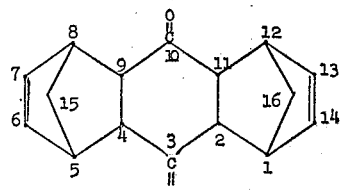

Pentacyclo[10.2.1$^{1,12}$1.$^{5,8}$0.$^{2,11}$0.$^{4,9}$]hexadeca-6,13-diene-3,10-dione and, generally, compounds comprising the structure

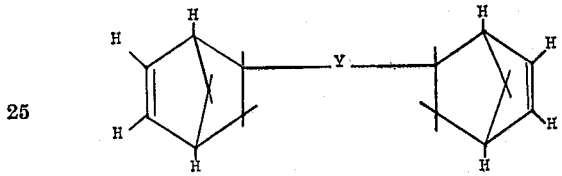

where Y is a divalent linkage, such as an oxa, thia, sulfinyl or sulfonyl linkage, or

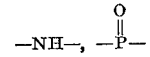

$$-NH-,\ -\overset{O}{\underset{}{P}}-$$

or an organic linkage such as alkylene, oxyalkyleneoxy, or

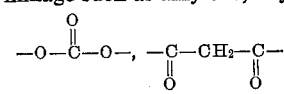

$$-O-\overset{O}{\underset{}{C}}-O-,\ -\overset{O}{\underset{}{C}}-CH_2-\overset{O}{\underset{}{C}}-$$

or nitrogen containing organic linkages such as

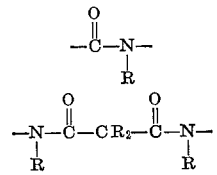

where R is lower alkyl and the like, it being understood that the type of linkage is immaterial to the effective hydration of the bicyclo[2.2.1]heptene double bond as aforedescribed.

Similarly, compounds containing two or more bicyclo[2.2.1]heptene double bonds are hydrated by the process of this invention. For example,

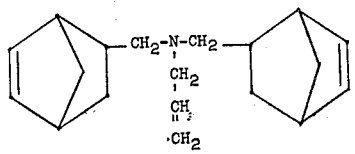

Allyl di(5-bicyclo[2.2.1]hept-2-enylmethyl)amine

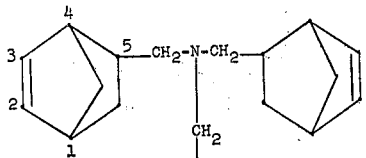

Tris-(5-bicyclo[2.2.1]hept-2-enylmethyl)amine or similar compounds wherein, e.g. the rings are attached directly to a phosphorus atom, can be employed as starting materials.

The second class of cyclic reactants utilizable in our invention, the nortricyclene compounds, comprise the following structure:

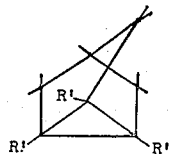

wherein the seven free valences can be variously satisfied as those of structures II and III, above, and wherein the R' radicals are defined as before. Such nortricyclene compounds are generally well-known to the art (see for example, Hanack et al. in Ann. 648 (1961)) and are exemplified by the following:

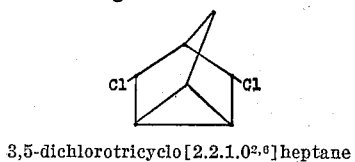

3,5-dichlorotricyclo[2.2.1.0²,⁶]heptane

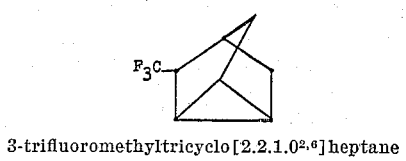

3-trifluoromethyltricyclo[2.2.1.0²,⁶]heptane

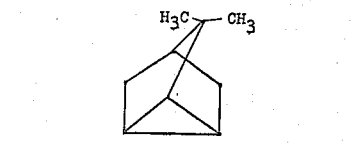

7,7-dimethyltricyclo[2.2.1.0²,⁶]heptane

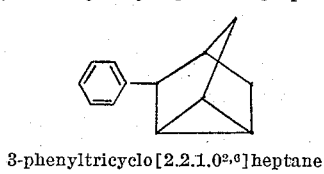

3-phenyltricyclo[2.2.1.0²,⁶]heptane

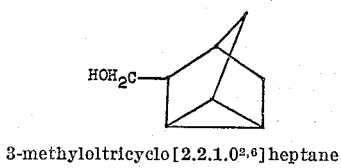

3-methyloltricyclo[2.2.1.0²,⁶]heptane

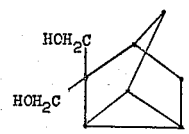

3,3-dimethyloltricyclo[2.2.1.0²,⁶]heptane

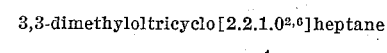

3-tricyclo[2.2.1.0²,⁶]heptanecarboxylic acid

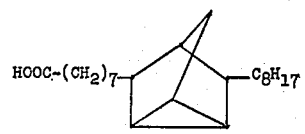

8-(5'-octyl-3-tricyclo[2.2.1.0²,⁶]heptane)octanoic acid

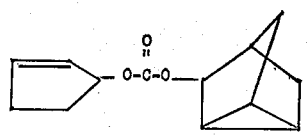

2-cyclopentenyl-5-(tricyclo[2.2.1.0²,⁶]heptyl)carbonate

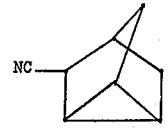

3-tricyclo[2.2.1.0²,⁶]heptane carbonitrile

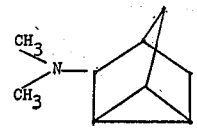

3-dimethylaminotricyclo[2.2.1.0²,⁶]heptane

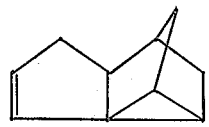

Tetracyclo[4.3.1.0¹,⁶0¹,³]dec-8-ene and similar compounds wherein R' of structure (IV), above, is other than hydrogen, i.e. an organic radical linked to a ring carbon atom through a carbon atom of the radical.

It will be understood that molecules containing both one or more bicyclo[2.2.1]heptene moieties and one or more nortricyclene moieties can be hydrated in accordance with our invention and that mixtures containing both bicyclo[2.2.1]heptene compounds and nortricyclene compounds can be hydrated as such without first separating the components. Thus the hydration of, e.g., equilibrium mixtures containing a bicyclo[2.2.1]heptene compound and the corresponding nortricyclene compound is within the compass of our invention.

In carrying out the process of our invention the starting material is reacted with water in a conversion zone in the contacting presence of a synthetic aryl cation exchange resin.

The synthetic resin catalysts used in our invention fall into two major classes, according to their physical structure. One class comprises the conventional sulfonated or phosphonated synthetic aryl cation exchange resins which require a certain water content for maintenance of physical rigidity. The second class comprises more recently developed resins prepared from the same starting materials but where polymerization is carried out in the presence of a "precipitant," a substance that is a good solvent for the monomer but a poor swelling agent for the polymer, to provide polymer structures which have a definite internal pore structure and do not collapse on drying. This latter type of resin will hereinafter be referred to as having a "macroreticular" or "macro-porous" structure.

The resins suitable for use as catalysts in our invention may be prepared in a variety of ways from a variety of raw materials. For instance, the sulfonation or equivalent acid treatment can be applied either to a monomer such as styrene which is subsequently polymerized into a suitable high molecular weight ion-exchange resin; or, preferably, the polymer may be formed first and the acid groups introduced by treating the solid polymer in suitably subdivided or granulated form.

Monomers from which our resin catalysts are prepared are the mono-vinyl aromatic compounds, exemplified by styrene, alkylated derivatives thereof such as p-methylstyrene, p-ethylstyrene, dimethylstyrene, and chlorinated styrenes such as p-chlorostyrene and dichlorostyrene. While monomers having alkyl or chloro substituents preferably carry such substituents in the position para to the vinyl group, isomeric monomers having ortho or meta substituents are useful also. Also illustrative of monomers suitable for making the catalysts used in our invention are polycyclic vinyl aromatic compounds, such as vinyl naphthalene and alkyl- or chloro-substituted vinyl naphthalene.

The monomer is preferably polymerized in the presence of a cross-linking agent to form suitable solid cross-linked polymers, but can also be copolymerized with other ethylenically mono-unsaturated compounds, such as isobutylene, acrylonitrile and its homologues, methyl acrylate or methacrylate and its higher alkyl homologues, to provide cross-linked copolymers. Suitable cross-linking agents are hydrocarbons containing two non-conjugated ethylenic linkages such as the divinyl aryl compounds exemplified by divinylbenzene, divinyltoluene, divinylxylene, divinylchlorobenzene, and the divinyl ethers such as ethylene glycol, divinyl ether. The cross-linking agent is preferably added to the styrene or other vinyl aromatic monomer in the polymerization mixture to produce a polymer with a three-dimensional lattice structure wherein interpolymerized divinyl aryl or divinyl ether compound forms cross-links between adjacent polystyrene chains. Instead of providing the required degree of cross-linking during synthesis, i.e. polymerization of the monomer, it may be desirable to form a thermoplastic polymer by use of the said vinyl aromatic monomer in conjunction with a minor amount of a conjugated diolefin such as butadiene or isoprene, which thermoplastic polymer can then be cross-linked by vulcanization with sulfur and the like. Still other ways to cross-link will be apparent to the skilled artisan. For example, certain styrene/divinylbenzene systems can be treated with carbon tetrachloride at 280° to 400° F. or be exposed to gamma rays at room temperature to provide the required degree of cross-linking.

The polymerization of the aforementioned ingredients can be carried out by any of the well-known methods, e.g. by simple heating at an elevated temperature such as 100° C. for a suitable length of time, such as 10 days. It is desirable to use a catalytic amount of an oxygen-yielding compound such as benzoyl peroxide, ammonium persulfate, potassium persulfate, sodium perchlorate, sodium perborate, ozone, ozonides, etc. The polymerization can be carried out either in homogeneous phase or in emulsion. For instance, satisfactory materials can be prepared according to the procedure described in Patent No. 2,089,444 or 2,500,149. Depending on the technique employed, the polymer can be produced either in the form of nearly spherical hard granules of a proper size for further use, or the polymer can be produced in the form of larger masses which are reduced to the desired particle size by crushing or cutting.

As mentioned above, certain catalysts suitable for use in our invention are prepared by conducting the polymerization in the presence of a precipitant, i.e. a reaction medium that is a good solvent for the monomer, e.g. styrene, but a poor swelling agent for the polymer, to provide a macro-reticular polymer structure. Typical precipitants suitable for vinyl aromatic compound/divinyl compound cross-linking agent systems are alkanols of from 4 to 10 carbon atoms, such as n-butanol, sec-butanol, tert.-amyl alcohol, n-hexanol, and decanol. Higher saturated aliphatic hydrocarbons, such as heptane, isooctane, and the like, can also function as precipitants in these systems. Typical styrene/divinylbenzene polymers prepared by polymerization in the presence of a precipitant contain from 6 to about 55 percent divinylbenzene, and preferably 10 to about 25 percent, the remainder being styrene. A fuller understanding of the macro-reticular polymer structures and their preparation may be had by reference to U.S. Patent 3,037,052, at column 1, line 27, to column 5, line 15, and to Kunin et al., J. Am. Chem. Soc., 84, 305 (1962).

In making the aforementioned polymers, both the conventional and macro-reticular type, into the desired cation-exchange resins, they are sulfonated or phosphonated in a manner otherwise well known so as to introduce on the average about 0.25 to 3, preferably about 0.5 to 2, inorganic acid radicals per benzene nucleus of the polymer. Suitable sulfonation agents include concentrated or fuming sulfuric acid, chloro-sulfonic acid, sulfur trioxide in nitrobenzene, etc. An excess of the sulfonating agent is used. Depending on the sulfonating agent used, temperature of sulfonation may be in the range of about −20° to 200° C., preferably −20° to +50° C. in the case of chloro-sulfonic acid. Higher temperatures are best with sulfuric acid. The resin is preferably in a relatively coarse particle size such as 20–100 mesh so as to be suitable for direct use in the eventual olefin hydration process. Thus, the subdivided copolymer, e.g., one containing 90 percent of combined styrene and 10 percent of combined divinylbenzene can be mixed with an excess of chloro-sulfonic acid, e.g., about 6 parts acid per part of copolymer and briefly heated at reflux temperature for about 3 minutes. Subsequently, the treated polymer is held at room temperature for about 50 hours, a large excess of water is added, and the resulting mixture is filtered, washed and dried. In a typical operation a yield of about 235 percent of sulfonated resin (based on copolymer) is thus obtained, i.e., about 235 grams of the desired sulfonated ion exchange resin can be obtained per 100 grams of the styrene-divinylbenzene copolymer. This sulfonated resin contains an average of about 1.77 sulfonic acid groups in each of its aromatic nuclei. At lower temperatures a less extensively sulfonated product is obtained, e.g., one containing a single sulfonate group per aromatic ring. Such a product tends to be more stable in all respects and may, therefore, be preferred in commercial operation.

When sulfonating conventional polymers, physical disintegration is minimized during sulfonation by swelling the granules in a suitable solvent such as benzene, toluene, xylene, carbon tetrachloride, trichloroethylene, tetrachloroethylene and the like, in a manner substantially as described in Patent No. 2,500,149. For instance, some granulated copolymers can be swelled by contact with 10 to 50 volume percent of a solvent such as tetrachloroethylene to as much as about 170% of the original copolymer volume. However, in most instances even slight swelling is helpful in reducing subsequent disintegration. After draining off excess solvent, the swollen granules are then treated with one of the sulfonating agents mentioned above, e.g., 98% sulfuric acid. The sulfonation reaction starts at the surface of each granule and is continued until the entire granule has been penetrated by the acid to give a complete reaction. The strength of the acid decreases as the sulfonation proceeds. After completion of the reaction the remaining acid is washed out with water, or first neutralized and then washed. As water replaces the acid, further swelling of the granules may occur, up to about 25 percent by volume. Too rapid dilution with water tends to weaken the resin structure and may result in subsequent fracture of the granules. It is, therefore, advisable to replace the residual acid by slow addition of water over a period of as much as 24 hours or more. Either stepwise or continuous water addition is suitable.

The washed sulfonated product is saturated with water and in a swollen state. Thus, conventional sulfonated resins normally contain from about 40 to 70 percent by weight of water. It is advisable to store such resins in water tight containers under conditions which will prevent drying out of the resin as undue loss of this water content may reduce the catalytic activity as well as the physical rigidity of the resin, thereby leading to disintegration of the granules upon subsequent contact with water. For instance, a resin originally containing 55 weight percent moisture may be dried out at 60% relative humidity to an equilibrium moisture content of only about 30 weight percent. When such a partially dried out resin is placed in water, water absorption may be so rapid that severe disintegration of the granules takes place. The macroreticular ion-exchange resins, on the other hand, are stable in the dry state and no such precautions need to be taken.

It will be understood that the ion exchange resin catalysts used in our invention as well as their preparation are well known and readily available as commercial products.

The conventional catalysts are exemplified by sulfonated polystyrenes or sulfonated styrene/divinylbenzene polymers sold under the trademarks "Dowex 50" by the Dow Chemical Company, "Permutit Q" by the Permutit Company, and "Amberlite IR–120" by the Rohm and Haas Company. The ion-exchange resins in their free acid form have an acidity of about 2 to 10 milli-equivalents per gram, depending on the resin base and extent of sulfonation. The preferred commercial resins usually have an acidity of about 5 milli-equivalents/gram.

Illustrative of the macro-reticular resins preferred as catalysts in our invention is the commercial material sold under the trademark "Amberlyst 15" by the Rohm and Haas Company.

The process of this invention is preferably carried out between about 50° C. and about 200° C. At temperatures below 50° C. the reaction is sluggish and at temperatures much above 200° C. the resin catalysts employed herein are subject to decomposition. We have found that in many cases the optimum balance between high reaction rates and catalyst decomposition, both of which increase with increasing temperatures, is achieved when operating between 75° C. and 150° C. and, therefore, we prefer to utilize reaction temperatures within this latter range.

Since the process of this invention is preferably carried out under substantially liquid-phase conditions, the pressure applied to the system should be sufficient to maintain the reaction mixture in the liquid state, i.e., the pressure should be higher than the total vapor pressure of the reaction mixture. Thus the operating pressure, while not narrowly critical, will normally be found to vary between atmospheric and 150 p.s.i.g. and, when operating within the preferred temperature range, will optimally be from about 2 p.s.i.g. to about 100 p.s.i.g.

While the stoichiometry of the hydration reaction requires molar equivalents of water and the cyclic starting material, an excess of water is preferably used to improve the starting material efficiency of our process. Thus up to 30 moles of water per mole of starting material can be advantageously used. More usually, the mole ratio of the reactants will be between 2 and about 15 moles of water per mole of the cyclic reactant.

The reaction time, or residence time, during which the reactants are in contact with the catalyst under hydration conditions of course depends on the other operating variables, e.g., temperature, pressure, feed composition, etc., as well as on the type of reaction, i.e., whether batch or continuous, and on the result desired. For example, relatively long reaction times are productive of high yields but are also accompanied by lowered efficiencies, increased by-product formation, and lower production rates per unit volume of reactor space. The optimum residence time for a specific system can be readily ascertained by one skilled in the art having in mind the precise goals to be achieved. It can be mentioned, for purposes of illustration, that reaction times may vary from one to about sixty hours and will, in many cases where the process is continuously operated, be between about two and about twelve hours.

The particular mode of carrying out the process of this invention is not narrowly critical and several alternative procedures will be apparent to those skilled in the art. For example, water and the cyclic starting material can be heated in a suitable stirred reaction vessel in the contacting presence of the resin catalyst and the reaction product can be removed in batchwise fashion. More advantageously, our process is carried out continuously, by feeding water and the starting material over a heated fixed bed of synthetic resin catalyst and continuously removing product at such a rate as to allow the desired residence time. Continuous operation can also be achieved by utilization of tubular reactors. For example, the cyclic reactant/water mixtures can be fed to the top of heated tubular reactor filled with synthetic resin catalyst and allowed to percolate downward by gravity through the fixed resin bed. The product is then collected at the base of the column.

An additional means of effecting the synthesis of the hydrated products over synthetic resin catalysts consists of heating a cyclic starting material/water mixture to a temperature above the vaporization point and feeding the vaporized azeotropic mixture through a heated tube containing synthetic resin catalyst, the resin bed also being held at a temperature above the vaporization point of the reactant mixture, and collecting the product mixture by cooling the effluent vapor stream from the reactor. In yet another application of the process disclosed herein, a starting material-water mixture may be heated to the reflux temperature of the azeotropic mixture of the two reactants, at either atmospheric or supra-atmospheric pressures, the azeotropic vapors being allowed to circulate, by appropriate means, around the exterior portion of a tubular reactor containing a fixed bed of synthetic resin catalyst, thus heating the resin bed to the temperature of the azeotropic vapors. Upon leaving the reactor zone, the vaporized reactant mixture is cooled and the condensate allowed to fall to the top of the resin bed and percolate downward through the resin, ultimately entering again the vessel from which the azeotropic vapors originated. Thus a cycle is established in which only the unreacted dicyclopentadiene and water are repassed through the resin bed, while the hydration product produced, being less volatile, remains in the heating vessel, out of contact with the catalytic resin. In this manner, side reactions between the product and the reactants may be held to a minimum.

The recovery of the hydration products from the hydration mixture is greatly simplified by the use of synthetic resin catalysts. The product from batchwise runs is simply filtered to remove the resin, the organic layer then being separated from the aqueous layer by decantation, and the oil layer distilled under reduced pressures to recover unreacted starting material and product alcohol. In syntheses where the reactants are passed over a fixed bed of synthetic resin, the only necessary operation prior to distillation is separation of the organic and aqueous layers. In some instances this separation may be facilitated by the addition of a diluent such as an aliphatic, aromatic or chlorinated hydrocarbon, or the addition of an aqueous solution of alkali metal salt to the aqueous layer, or both.

The following examples are presented to show in detail specific embodiments of our invention. It is understood that they are illustrative and are not to be construed as limiting the scope of our invention as hereinabove disclosed.

*Example 1.—Hydration of dicyclopentadiene*

*Experiment A.*—To a stirred flask were charged 264 grams (2 moles) of endo-dicyclopentadiene, 1000 grams (55.5 moles) of water, and 500 grams of a sulfonated high molecular weight resinous copolymer of styrene and divinylbenzene (sold by the Dow Chemical Company under the name "Dowex 50X"). The mixture was heated to reflux temperature and maintained at reflux for eleven hours. The reaction mixture was then filtered to remove the resin and the organic layer was separated frome the filtrate by decantation. The resin and the aqueous layer were washed with diethyl ether and the ether extracts were combined with the organic layer. The resulting organic product was distilled under reduced pressure to give 47 grams (a yield corresponding to 13 percent of the theoretical) of exo-tricyclo(5.2.1.0$^{2,6}$)dec-3-en-8(9)-ol (93.5% purity by hydroxyl analysis, $n$-30/D 1.5175–1.5209). The identity of the product was verified by comparison of its infrared spectrum with that of an authentic sample prepared by the sulfuric acid hydration of dicyclopentadiene.

*Experiment B.*—Dicyclopentadiene (264 grams—2 mols) and water (1000 grams—55.5 mols) were heated to reflux in a stirred flask in the presence of Amberlite IR–120–AG ion exchange resin, sold by the Rohm and Haas Chemical Company. After eleven hours at reflux, the mixture was filtered to remove the resin and the product alcohol recovered as in Example 1. Distillation gave fractions (B.P. 87–95° C. at 3.5–4.5 mm.) identified by their infrared spectra as exo-tricyclo-(5.2.1.0$^{2,6}$)dec-3-en-8(9)-ol (91–96% purity by hydroxyl analysis $n$-30/D, 1.5208–1.5227) in 59.0% yield.

*Analysis.*—Calculated for $C_{10}H_{14}O$: Percent C, 79.95; percent H, 9.39. Found: Percent C, 79.53; percent H, 9.54.

*Experiment C.*—Over a period of five and one-half hours, dicyclopentadiene (410 ml.—3.03 mols) and water (460 ml.—25.6 mols) were fed to the top of a steam jacketed glass column packed with Amberlite IR–120–AG (340 ml.) ion exchange resin. The tubular reaction chamber was held at atmospheric pressure and approximately 100° C. The reactants were allowed to percolate downward through the resin bed by gravity and the effluent was collected in a flask at the base of the column. The organic product layer was separated from the heterogeneous mixture and distilled to give 45 grams (an approximate 9% yield) of a slightly viscous, oil liquid identified as exo-tricyclo(5.2.1.0$^{2,6}$)dec-3-en-8(9)-ol by infrared examination.

*Experiment D.*—Dicyclopentadiene (396 grams—3 mols) and water (250 grams—13.9 mols) were charged to a flask and heated to reflux under nitrogen ebullation. The vapors of the resultant azeotrope (B.P. 98° C., 32.3% water by weight) were allowed to circulate through a jacket surrounding a section of glass tubing containing a bed of Amberlite IR–120–AG ion exchange resin (573 grams), by which means the resin bed was heated to the temperature of the azeotropic vapors. The hot vapor was then condensed, and the condensate allowed to drop directly onto the top of the resin bed, and percolate downward through the resin, as in a conventional extractor. Drainage from the resin bed, containing product hydrate, was then returned to the boiling flask. After thirty hours operation of this reaction system, distillation of the organic layer separated from the reaction mixture gave, in addition to unreacted dicyclopentadiene, 144 grams of a fore-run (B.P. 96–97.5° C. at 5 mm.—92.5% product alcohol by hydroxyl analysis) and 263 grams of main fraction (B.P. 97.5° C./5 mm.—102° C./4.5 mm., 97% purity by hydroxyl analysis, $n$-30/D, 1.5228–1.5232), representing 90.3% of the theoretical yield to exo-tricyclo (5.2.1.0$^{2,6}$)dec-3-en-8(9)-ol, identified by its infrared spectrum.

*Experiment E.*—A mixture of dicyclopentadiene (1056 grams—8 mols) and water (864 grams—48 mols) was charged to a stainless steel cyclic tubular reactor. The reactor was then closed to the atmosphere, and, by means of a centrifugal pump, the reaction mixture was circulated continuously through a bed of Amberlite IR–120–AG synthetic ion exchange resin (762 ml.—565 grams) held in a section of 2 inch diameter stainless steel pipe 14 inches in length by retaining screens positioned at both ends of the column of resin. The bed of resin was maintained at a temperature of 100° C. by external heating. After twenty-four hours of continuous recirculation of the reaction mixture through the resin bed at 100° C., the reaction was terminated and the reactor drained. After separation of the organic and aqueous layers, the crude product layer was distilled under reduced pressure to give a fore-cut of unreacted dicyclopentadiene and a product fraction (B.P. 85–90° C. at 3 mm.) containing the product alcohol in 38.4% yield. The infrared spectrum of the distilled product was consistent with the proposed structure of exo-tricyclo(5.2.1.0$^{2,6}$)dec.-3-en-8(9)-ol and was identical to the spectrum of authentic samples of the alcohol. Upon calculation, the production rate was found to be 25.2 grams of product/liter of resin/hour reaction time.

*Experiment F.*—A mixture of dicyclopentadiene (1320 grams—10 mols) and water (1080 grams—60 mols) was charged to the same cyclic tubular reactor described in Experiment E. The reactor was closed and the reactants were cycled continuously for 21 hours at 100° C. over a bed of macroreticular synthetic resin catalyst (768 ml.— 653 grams) sold by the Rohm and Haas Chemical Company under the name "Amberlyst 15." After separation of the aqueous phase, the crude organic product layer was distilled under reduced pressure to give unreacted dicyclopentadiene and the product alcohol in 77.4% yield. Infrared examination verified the composition of the distilled product as exo-tricyclo(5.2.1.0$^{2,6}$)dec-3-en-8(9)-ol. Calculation indicated a production ratio of 72 grams product/liter of resin/hour.

*Experiment G.*—A mixture of dicyclopentadiene (1320 grams—10 mols) and water (360 grams—20 mols) was charged to the same cyclic reactor, and circulated in a closed system over the same resin bed as that described in Experiment. The reactor was operated for 14.5 hours at a reaction temperature of 125° C. Distillation of the crude organic layer gave the product alcohol in 73.8% yield at a production ratio of 99.4 grams/liter catalyst/hour.

*Experiment H.*—A mixture of dicyclopentadiene (1320 grams—10 mols) and water (360 grams—20 mols) was reacted in the manner of Experiment G and over the same resin for 14.5 hours at a reaction temperature of 51–54° C. Distillation of the organic layer gave the product alcohol in 1.4% yield at a production ratio of 2 grams/liter of resin/hour.

*Experiment I.*—As exemplary of continuous operation of the process of this invention, the following experiment was performed.

A mixture of dicyclopentadiene (2640 grams—20 mols) and water (900 grams—50 mols) was charged to a stainless steel cyclic reactor similar to that employed in Experiments E to I, modified for continuous operation by provisions for feeding reactants to, and removing reaction mixture from, the reactor system continuously and concurrently. The reactor was closed to the atmosphere and dicyclopentadiene and water were fed independently to the suction or intake side of the centrifugal cycle pump at rates calculated to maintain a molar ratio of water to dicyclopentadiene of 2.5 to 1. By means of a pressure differential sensing device, product mixture was removed continuously from the reactor through a motor valve at such a rate as to maintain a constant volume of circulating liquid in the reactor. The reaction mixture was circulated continuously over a bed of Amberlyst 15 synthetic resin catalyst (1225 grams—1400 ml.) maintained at a temperature of 125° C. Reactant feeds and product removal system were balanced so as to maintain a residence time of four hours (that is, feed volumes were adjusted so as to replace the total volume of liquid in the reactor every four hours). After about eight hours of continuous operation, analysis of the product mixture revealed identical composition of the product stream from hour to hour, indicating establishment of equilibrium conditions. A sample of the organic phase of the product mixture was distilled at this point and found to contain 31.9% by weight of dicyclopentadiene, 62.3% by weight of product alcohol, 3.1% by weight of water, and 2.7% by weight of undistillable residue. Exo - tricyclo(5.2.1.0$^{2,6}$)dec-3-en-8 (9)-ol (B.P. 112° C. at 0.8 mm.; $n$-30/D, 1,5228–1,5232, 96.3% purity by hydroxyl analysis) was thus produced in 62.1% yield at a production rate of 332 grams per liter of resin catalyst per hour of operation.

*Example II.—Hydration of bicyclo[2.2.1]2,5-heptadiene*

*Experiment A.*—To a five-liter 4-necked and round bottom flask fitted with a mechanical stirrer, condenser and thermometer was added 1000 grams (10.86 moles) of bicyclo[2.2.1]2,5-heptadiene, 2350 grams (130.5 moles) of water and 350 grams of Amberlyst 15 cationic exchange resin. The mixture was heated with stirring for 24 hours during which time the kettle temperature rose from 76–87° C. The catalyst was then removed by filtration and the filtrate concentrated to a light brown solid on a rotary evaporator. The crude bicyclo[2.2.1]heptanediol was triturated with hot benzene to yield 1181 grams of diol having a melting point of 156–159° C. 304 grams of this material was dissolved in acetone, treated with decolorizing charcoal, filtered and 258 grams of white diol was recovered from benzene-acetone (M.P. 177–181.5°, 85% recovery). Upon further recrystallization a product having a melting point of 179.5–182° C. was obtained.

*Experiment B.*—A mixture of 46 grams (0.5 mole) of bicyclo[2.2.1]2,5-heptadiene, 108 grams of water (6 moles) and 44 grams of Amberlite CG–120 (H+ form) was heated as described above for 16 hours during which time the temperature rose from 70 to 90°. Concentration on a rotary evaporator gave 59.5 grams of crude diol, corresponding to a yield of 93 percent of theory, having a melting point of 151–154° C. Two recrystallizations from benzene-acetone raised the melting point to 182.5–184° C.

*Experiment C.*—Experiment B was repeated substituting 44 grams of Amberlite 200 (H+ form) which had been ground in a mortar and pestle. The temperature rose from 76–100° C. during the reaction, and concentration on a rotary evaporator gave 56.5 grams of the crude diol (88.3% yield), M.P. 159–161° C. Two recrystallizations raised the melting point to 184.5–186° C.

*Experiment D.*—Experiment C was repeated substituting 30 grams of ground Dowex 50 WX–8 (H+ form) for the Amberlite resin. The temperature rose from 73–90° C. during the reaction. Concentration of the resulting liquid gave 57.2 grams of the crude diol (89.4% of theoretical), melting point 158–160°. Two recrystallizations from acetone-benzene raised the melting point to 183.5–185° C.

*Example III.—Hydration of bicyclo[2.2.1]hept-5-ene-2-ol*

A charge of 46 grams (0.417 mole) of bicyclo[2.2.1]hept-5-ene-2-ol in 110 grams of water was heated over 25 grams of Amberlite CG–120 (H+ form) for twenty-two hours during which time the temperature rose from 97° C. to 100° C. The crude yield of bicyclo[2.2.1]heptanediol product was 49.7 grams corresponding to 93 percent of theory. The product had a melting point of 169–170° C. after recrystallization from acetone-benzene.

*Example IV.—Hydration of 5,5-dimethylbicyclo[2.2.1]hept-2-ene*

A mixture of 25 grams (0.204 mole) of 5,5-dimethylbicyclo[2.2.1]hept-2-ene, 150 grams (8.33 moles) of water was heated at reflux for 30 hours over 30 grams of Amberlite CG–120 cation exchange resin (H+ form). The resulting reaction product mixture was filtered and the filtrate was extracted with ethyl acetate. Upon concentration of the extract there was obtained 26.2 grams, corresponding to a yield of 91.4 percent of theory of 5,5-dimethylbicyclo[2.2.1]heptan-2(3)ol which had a boiling point of 71° C. at 3 millimeters, $n^{30}$ 1.4782.

*Example V.—Hydration of bicyclo[2.2.1]hept-5-ene-2,2-dimethanol*

A mixture of 100 grams of bicyclo[2.2.1]hept-5-ene-2,2-dimethanol (0.65 mole), 500 grams of water (27.7 moles) and 100 grams of Amberlite CG–120 was heated at reflux for 20 hours. After filtration and concentration of the filtrate 97.25 grams of a viscous oil was recovered. Distillation of this material gave 38.95 grams of 6-oxatricyclo[3.2.1.1$^{3,8}$]nonane - 1 - methanol, M.P. 95–98° C. Crystallization of the distillation residue from alcohol-ethyl acetate gave 53.30 grams of bicyclo[2.2.1]hept-5(6)-ol-2,2-dimethanol, melting point 137.5–138.5°.

*Example VI.—Hydration of 5-phenylbicyclo[2.2.1]-heptane-2(3)ol*

A mixture of 30 grams of 5-phenylbicyclo[2.2.1]hept-2-ene (0.176 mole), 150 grams of water (8.33 moles) and 30 grams of Amberlite CG–120 (H+ form) was heated at reflux for 48 hours. After filtration, ether extraction of the filtrate and concentration of the ether solution 32.42 grams of material was recovered. Vapor phase chromatography showed that this material was approximately 13 percent starting material and 87 percent 5-phenylbicyclo[2.2.1]heptane-2(3)ol, which represents a crude yield of the alcohol of 85 percent with an efficiency of 99 percent. The product has boiling point 123–125°/0.5 mm., $n^{30}$ 1.5503.

*Example VII.—Hydration of exo-bicyclo[2.2.1]hept-2-ene-5-carbonitrile*

A mixture of 25 grams of the above nitrile (0.21 mole), 150 grams of water (8.33 moles) and 30 grams of Amberlite CG–120 was heated at reflux for 40 hours. After acidification of the reaction mixture, filtering, ether extraction, and concentration of the ether, 21.9 grams of material was recovered. This was separated into a mixture of 5.68 grams of an acidic and 15.52 grams of a neutral fraction. Analyses by vapor phase chromatography and infrared spectroscopy indicated that a mixture of all the possible hydrated and unhydrated nitriles, amides and acids was present.

*Example VIII.—Hydration of tetracyclo[6.2.1.1$^{1,8}$1.$^{3,6}$, 0$^{2,7}$]4,9-dodecadiene*

The above diene (50 grams, 0.298 mole) in 150 grams (8.33 moles) of water was heated at reflux in the presence of 50 grams of Amberlyst 15 resin for 24 hours. After filtration, ether extraction of the filtrate, and concentration of the ether solution, 50.01 grams of material was recovered. Starting material, 28.71 grams, was recovered by distillation to leave 21.3 grams of residue which by vapor phase chromatography contained no starting diene. Distillation of the residue gave a solid mono alcohol having a melting point of 70–71° C. after recrystallization from pentane. This product alcohol is one or a mixture of the "half bird cage" alcohols described by De Vries et al. in J. Am. Chem. Soc. 82, 5363 (1960). The acid phthalate of this material had a melting point of 172–174° C.

*Example IX.—Hydration of 3-hydroxynortricyclene*

To a 500 millimeter round bottom 4-necked flask fitted with a mechanical stirrer, condenser, and a thermometer was added 40 grams of crude 3-hydroxynortricyclene (0.363 mole), 150 grams of water (8.35 moles) and 40 grams of Amberlite CG–120 cation exchange resin (H+ form). The mixture was heated at 100° with stirring for 18 hours, filtered and the filtrate concentrated to give 45.8 grams (98.3% of theory) of the crude bicyclo[2.2.1]heptanediol, a white solid which, upon two recrystallizations from acetone-benzene, had a melting point of 182–183.5° C.

*Example X.—Hydration of nortricyclene*

A charge of 30 grams of nortricyclene (0.32 mole), 200 grams of water (11.1 moles), and 30 grams of acidic cation exchange catalyst (Amberlite CG–120, H+ form) was introduced into a 500-milliliter flask fitted with a thermometer, condenser, and mechanical stirrer. The resulting mixture was heated at reflux for five hours, during which time the reaction temperature rose from 83° C. to 100° C. The resulting reaction mixture was filtered and the filtrate was extracted with ether. The resulting ether extract was concentrated to give 32.75 grams of crude exo-bicyclo(2.2.1)heptan-2-ol. After recrystallization from 2,2-dimethylbutane, the melting point of the product compound was 125.5–126.5° C.

What is claimed is:

1. A process for hydrating a cyclic reactant containing at least one of the following structures:

(A)

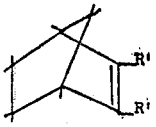

bicyclo(2.2.1)heptene compounds (B)

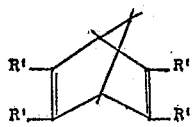

bicyclo(2.2.1)heptadiene compounds, and (C)

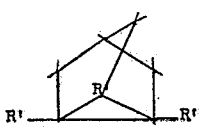

Tricyclo(2.2.1.0$^{2,6}$)heptane compounds wherein each R' individually is hydrogen or lower alkyl, which process comprises maintaining a mixture of said cyclic reactant and water in a conversion zone under hydration conditions at a temperature between 50° C. and 200° C. in the contacting presence of a synthetic sulfonated cation exchange resin catalyst consisting essentially of an aryl hydrocarbon skeleton.

2. A process as claimed in claim 1 wherein the cation exchange resin is a sulfonated cross-linked polymer of a styrene.

3. A process as claimed in claim 2 wherein the said resin is a sulfonated cross-linked polymer consisting essentially of styrene and divinyl benzene.

4. A process as claimed in claim 3 wherein the said resin has a macroreticular structure.

5. A process for hydrating a bicyclo(2.2.1)heptene compound comprising the following structure:

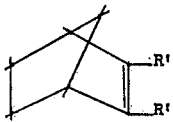

wherein each R' individually is hydrogen or lower alkyl, which process comprises maintaining a mixture of said compound and water in a conversion zone under hydration conditions at a temperature between 50° C. and 200° C. in the contacting presence of a synthetic sulfonated cation exchange resin catalyst consisting essentially of an aryl hydrocarbon skeleton.

6. A process for hydrating a bicyclo(2.2.1)heptadiene compound comprising the following structure

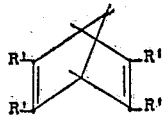

wherein each R' individually is hydrogen or lower alkyl, which process comprises maintaining a mixture of said compound and water in a conversion zone under hydration conditions at a temperature between 50° C. and 200° C. in the contacting presence of a synthetic sulfonated cation exchange resin catalyst consisting essentially of an aryl hydrocarbon skeleton.

7. A process for hydrating a tricyclo(2.2.1.0$^{2,6}$) heptane compound comprising the following structure

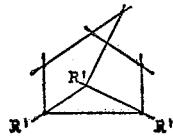

wherein each R' individually is hydrogen or lower alkyl, which process comprises maintaining a mixture of said cyclic reactant and water in a conversion zone under hydration conditions at a temperature between 50° C. and 200° C. in the contacting presence of a synthetic sulfonated cation exchange resin catalyst consisting essentially of an aryl hydrocarbon skeleton.

8. A process for hydrating a double bond contained in a bicyclo(2.2.1)heptene compound and showing infrared absorption between 6.32$\mu$ and 6.40$\mu$, which process comprises maintaining a mixture of water and said compound in a conversion zone under hydration conditions at a temperature between 50° C. and 200° C. in the contacting presence of a synthetic sulfonated cation exchange resin catalyst consisting essentially of an aryl hydrocarbon skeleton.

9. A process for hydrating dicyclopentadiene to exo-tricyclo(5.2.1.0$^{2\ 6}$)dec-3-en-8(9)-ol which comprises maintaining a mixture of water and dicyclopentadiene in a conversion zone under hydration conditions at a temperature between 50° C. and 200° C. in the contacting presence of a synthetic sulfonated cation exchange resin catalyst consisting essentially of an aryl hydrocarbon skeleton.

10. A process for hydrating bicyclo(2.2.1)hept-2-ene to bicyclo(2.2.1)heptan-2(3)ol which comprises maintaining a mixture of water and bicyclo(2.2.1)hept-2-ene in a conversion zone under hydration conditions at a temperature between 50° C. and 200° C. in the contacting presence of a synthetic sulfonated cation exchange resin catalyst consisting essentially of an aryl hydrocarbon skeleton.

11. A process for hydrating bicyclo(2.2.1)-2,5-heptadiene to bicyclo(2.2.1) heptanediol which comprises maintaining a mixture of water and bicyclo(2.2.1)-2,5-heptadiene in a conversion zone under hydration conditions at a temperature between 50° C. and 200° C. in the contacting presence of a synthetic sulfonated cation exchange resin catalyst consisting essentially of an aryl hydrocarbon skeleton.

12. A process for hydrating bicyclo(2.2.1)hept-5-ene-2-ol to bicyclo(2.2.1)heptanediol which comprises maintaining a mixture of water and bicyclo(2.2.1)hept-5-ene-2-ol in a conversion zone under hydration conditions at a temperature between 50° C. and 200° C. in the contacting presence of a synthetic sulfonated cation exchange resin catalyst consisting essentially of an aryl hydrocarbon skeleton.

13. A process for hydrating 3-hydroxynortricyclene to bicyclo(2.2.1)heptanediol which comprises maintaining a mixture of water and 3-hydroxynortricyclene in a conversion zone under hydration conditions at a temperature between 50° C. and 200° C. in the contacting presence of a synthetic sulfonated cation exchange resin catalyst consisting essentially of an aryl hydrocarbon skeleton.

14. A continuous process for hydrating dicyclopentadiene which comprises passing a feed mixture of dicyclopentadiene and water through a reaction chamber containing a bed of a cation exchange resin catalyst comprising a sulfonated cross-linked polymer consisting essentially of styrene and divinylbenzene while maintaining said mixture at a temperature of from 50° C. to 200° C. for a time sufficient to form dicyclopentadiene hydrate, cooling the product stream from the reaction, and collecting hydrated dicyclopentadiene.

15. The continuous process as claimed in claim 14 wherein the reactor pressure is from 2 p.s.i.g. to 100 p.s.i.g.

16. A process for hydrating dicyclopentadiene which comprises vaporizing a feed mixture of dicyclopentadiene and water, circulating the resulting vapors around the exterior portion of a vertically disposed tubular reactor containing a fixed bed of a cation exchange resin catalyst comprising a sulfonated cross-linked polymer consisting essentially of styrene and divinylbenzene thereby heating said bed to the temperature of said vapors, cooling said vapors upon leaving the reactor zone, allowing the resulting condensate to percolate downward through said bed and collecting hydrated dicyclopentadiene at the bottom of said reactor.

References Cited

UNITED STATES PATENTS

| | | | |
|---|---|---|---|
| 2,477,380 | 7/1949 | Kreps et al. | 260—641 |
| 2,730,548 | 1/1956 | Bluestone et al. | 260—617 |
| 2,813,908 | 11/1957 | Young | 260—641 X |
| 2,861,045 | 11/1958 | Langer | 260—641 X |
| 3,256,250 | 6/1966 | Frilette | 260—641 X |
| 3,257,469 | 6/1966 | Kovach | 260—641 |

OTHER REFERENCES

Bruson et al.: J. Am. Chem. Soc., vol. 67, pp. 723–28 (1945).

Roberts et al.: J. Am. Chem. Soc., vol. 77, pp. 3034–37 (1955).

Roberts et al.: J. Am. Chem. Soc., vol. 72, pp. 3116–24 (1950).

LEON ZITVER, *Primary Examiner.*

BERNARD HELFIN, *Examiner.*

T. G. DILLAHUNTY, *Assistant Examiner.*